(12) United States Patent
Grodkiewicz et al.

(10) Patent No.: US 11,820,419 B2
(45) Date of Patent: Nov. 21, 2023

(54) RIDER BOARD ATTACHMENT DEVICE

(71) Applicants: Jeremy P. Grodkiewicz, Portland, OR (US); Alan S. Crarer, Santa Cruz, CA (US); Torence Lu, Fremont, CA (US); Andrew B. Igdaloff, Brooklyn, NY (US)

(72) Inventors: Jeremy P. Grodkiewicz, Portland, OR (US); Alan S. Crarer, Santa Cruz, CA (US); Torence Lu, Fremont, CA (US); Andrew B. Igdaloff, Brooklyn, NY (US)

(73) Assignee: BABY GENERATION, INC., New York, NY (US)

( * ) Notice: Subject to any disclaimer, the term of this patent is extended or adjusted under 35 U.S.C. 154(b) by 0 days.

(21) Appl. No.: 17/525,567

(22) Filed: Nov. 12, 2021

(65) Prior Publication Data
US 2023/0150563 A1    May 18, 2023

(51) Int. Cl.
*B62B 9/28*       (2006.01)
*B62B 5/08*       (2006.01)

(52) U.S. Cl.
CPC ............ *B62B 9/28* (2013.01); *B62B 5/087* (2013.01)

(58) Field of Classification Search
CPC .. B62B 9/28; B62B 5/087; B62B 9/12; B62B 9/00; B62B 7/142
See application file for complete search history.

(56) References Cited

U.S. PATENT DOCUMENTS

| | | | |
|---|---|---|---|
| 6,827,356 B2 | 12/2004 | Zhuang | |
| 7,971,884 B2* | 7/2011 | Lundh | B62B 9/28 280/47.38 |
| 8,631,892 B2 | 1/2014 | Constin | |
| 8,714,582 B2 | 5/2014 | Hei et al. | |
| 9,789,894 B2 | 10/2017 | Weber et al. | |
| 10,286,977 B1* | 5/2019 | Haenel | B62K 27/14 |
| 10,773,768 B2 | 9/2020 | Berendzen et al. | |
| 11,220,281 B2* | 1/2022 | Bar-Or | B62B 5/0016 |
| 2001/0033069 A1 | 10/2001 | Ivers | |
| 2008/0088115 A1* | 4/2008 | Yang | B62B 9/28 280/642 |
| 2010/0109270 A1* | 5/2010 | Hei | B62B 9/28 280/47.35 |

(Continued)

FOREIGN PATENT DOCUMENTS

| | | | | |
|---|---|---|---|---|
| CN | 202574330 U | * | 12/2012 | ............... B62B 7/06 |
| CN | 112109795 A | * | 12/2020 | ........... B62B 5/0079 |

(Continued)

OTHER PUBLICATIONS

Translated DE-202008008860-U1 (Year: 2022).*

*Primary Examiner* — James A Shriver, II
*Assistant Examiner* — Ian Bryce Shelton
(74) *Attorney, Agent, or Firm* — Thompson Hine LLP

(57) ABSTRACT

A system including an adapter configured to releasably couple a rider board to stroller that has at least one support bar. The adapter is configured to be coupled to a frame of the stroller, where the adapter includes an engagement bar configured to be positioned rearwardly of a portion of the frame to which the adapter is coupled. The adapter includes a body having a recess configured to closely receive the at least one support bar of the stroller therein.

21 Claims, 8 Drawing Sheets

(56) References Cited

U.S. PATENT DOCUMENTS

| | | | | |
|---|---|---|---|---|
| 2011/0278823 | A1* | 11/2011 | Lai | B62B 5/087 |
| | | | | 280/504 |
| 2012/0217720 | A1* | 8/2012 | Lai | B62B 9/28 |
| | | | | 280/204 |
| 2015/0266494 | A1* | 9/2015 | Weber | B62B 5/087 |
| | | | | 280/650 |
| 2015/0314660 | A1* | 11/2015 | Lee | B62B 9/28 |
| | | | | 280/446.1 |
| 2016/0257331 | A1* | 9/2016 | Nuske | B62B 9/28 |
| 2019/0084605 | A1* | 3/2019 | Berendzen | A63C 17/04 |
| 2019/0092363 | A1* | 3/2019 | Ostergaard | B62B 3/008 |
| 2019/0161105 | A1* | 5/2019 | Baron | B62B 9/28 |
| 2019/0367068 | A1* | 12/2019 | Chaudeurge | B62B 7/145 |

FOREIGN PATENT DOCUMENTS

| | | | | |
|---|---|---|---|---|
| DE | 20 2005 001 707 | | 10/2005 | |
| DE | 202008008860 U1 | * | 1/2009 | B62B 9/28 |
| DE | 202010016119 U1 | * | 3/2011 | B62B 3/008 |
| GB | 2 311 261 | | 9/1997 | |
| GB | 2566331 A | * | 3/2019 | B62B 5/087 |
| WO | WO-2015054725 A1 | * | 4/2015 | B62B 9/12 |
| WO | WO-2020256352 A1 | * | 12/2020 | B62B 5/0079 |

* cited by examiner

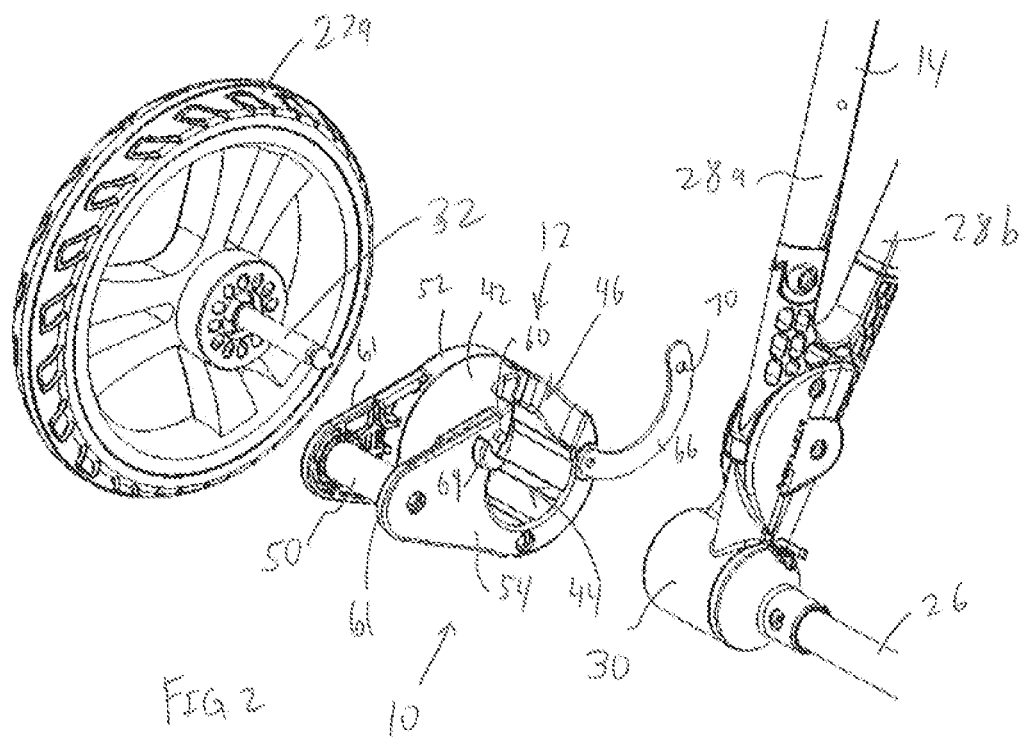
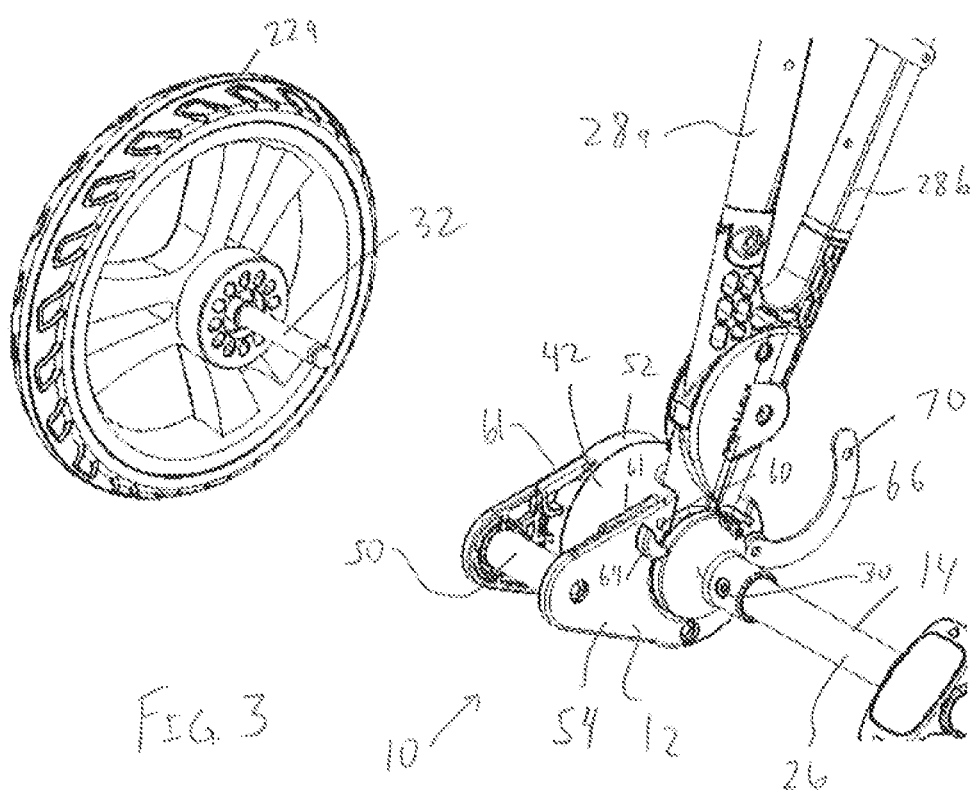

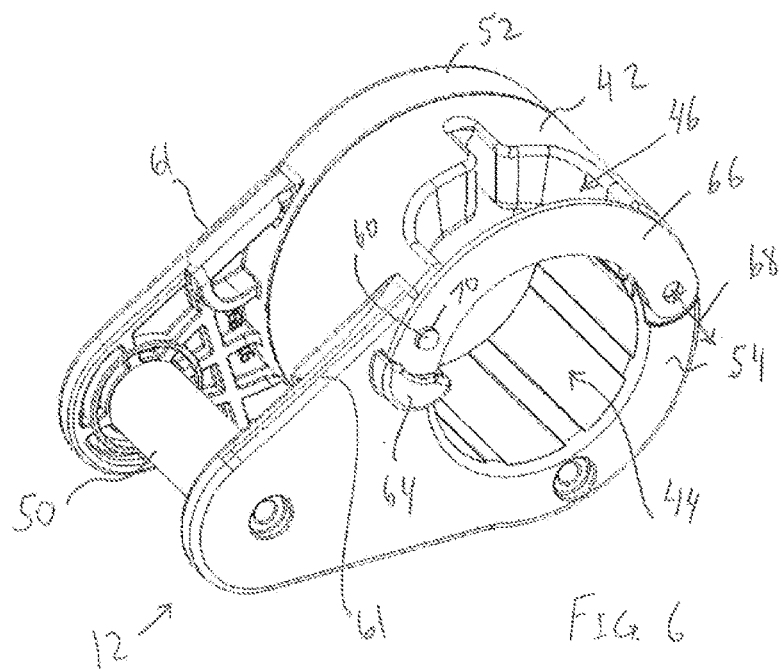
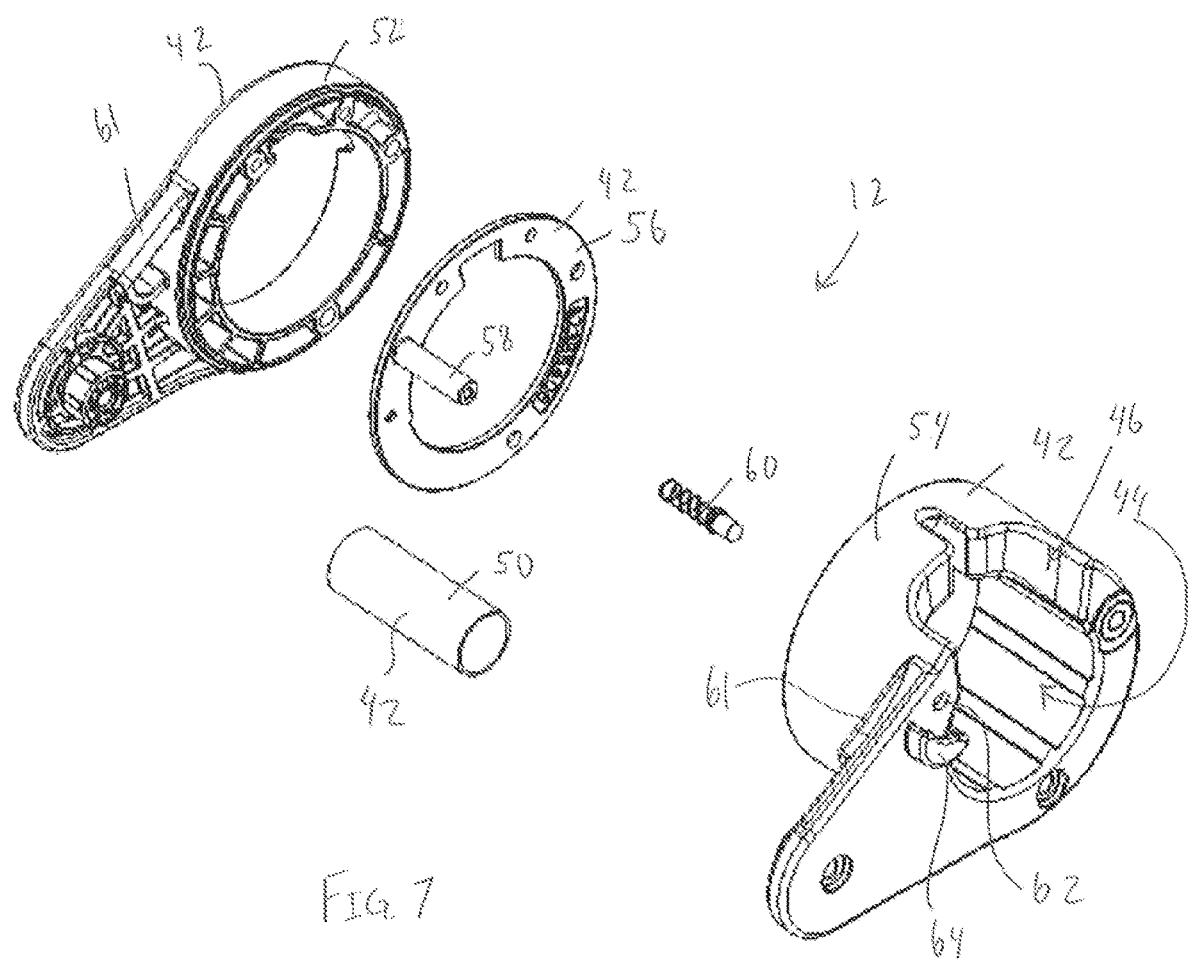

RIDER BOARD ATTACHMENT DEVICE

This application is directed to an attachment device, and more particularly to a device for attaching a rider board to a stroller.

BACKGROUND

Rider boards can be used in conjunction with strollers to provide a structure upon which a child can stand or ride during use of the stroller. It may be desired to releasably attach the rider board to the stroller such that the rider board can be removed when not in use. However, existing devices for attaching a rider board to a stroller can be relatively difficult to install, may not be securely coupled to the stroller and/or may not provide ease of connection to the rider board.

SUMMARY

In one embodiment the present invention is an adapter configured to releasably couple a rider board to a stroller, where the adapter can be relatively easy to install, can be relatively securely coupled to the stroller and/or provides easy relatively easy connection to the rider board. More particularly, in one embodiment the invention is a system including an adapter configured to releasably couple a rider board to stroller that has at least one support bar. The adapter is configured to be coupled to a frame of the stroller, where the adapter includes an engagement bar configured to be positioned rearwardly of a portion of the frame to which the adapter is coupled. The adapter includes a body having a recess configured to closely receive the at least one support bar of the stroller therein.

BRIEF DESCRIPTION OF THE DRAWINGS

FIG. 2 is a detail view of a rear lower portion of the stroller of FIG. 1, with a wheel removed and an adapter positioned between the wheel and the frame of the stroller;

FIG. 3 shows the adapter of FIG. 2 positioned on the stroller frame;

FIG. 6 is a perspective view of the adapter of FIG. 2, with the clip in its closed position;

FIG. 7 is an exploded view of the adapter body of the adapter of FIG. 6;

DETAILED DESCRIPTION

Figure 1:
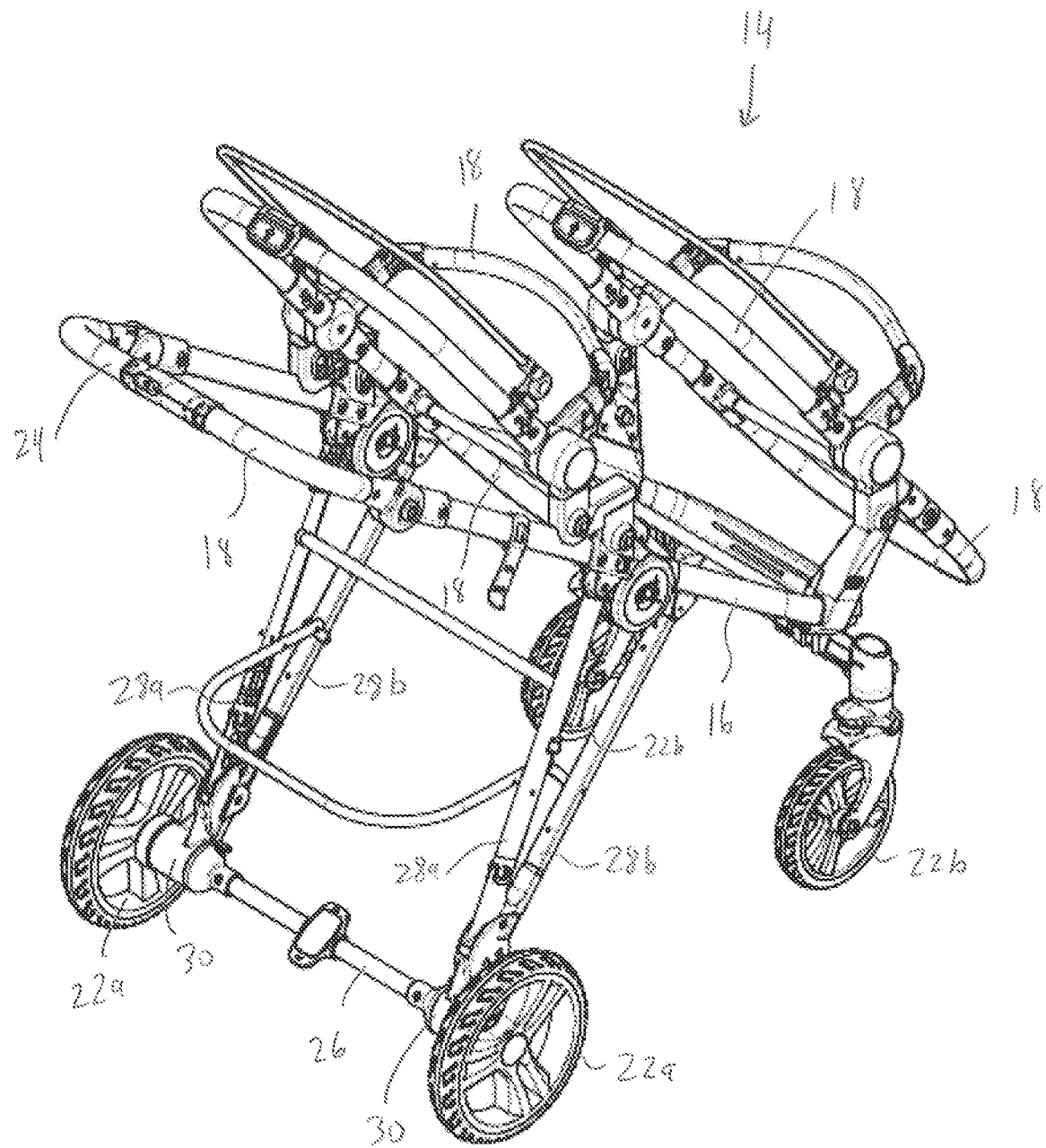
FIG. 1 is a rear perspective view of a stroller.
Figure 10:
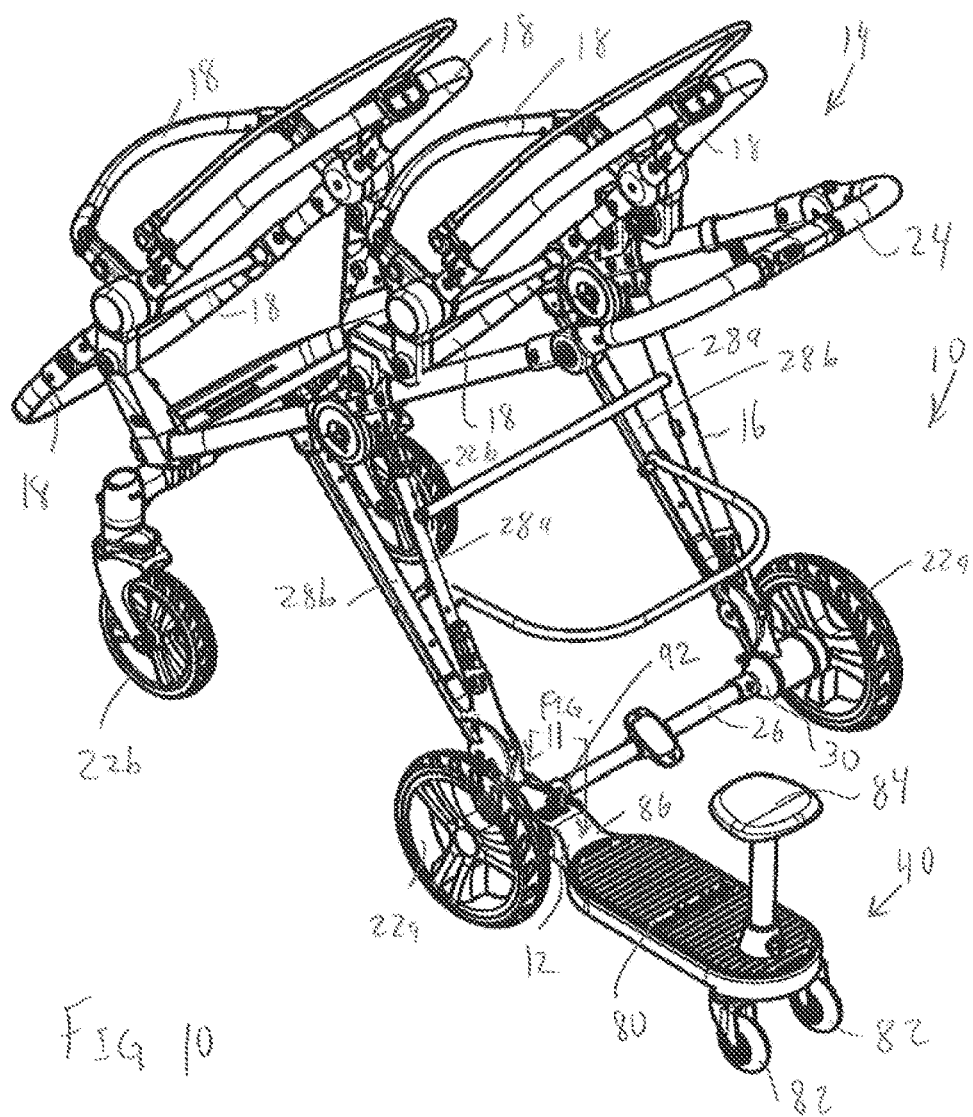
FIG. 10 is another perspective view of the rider board and stroller of FIG. 9.
Figure 14:
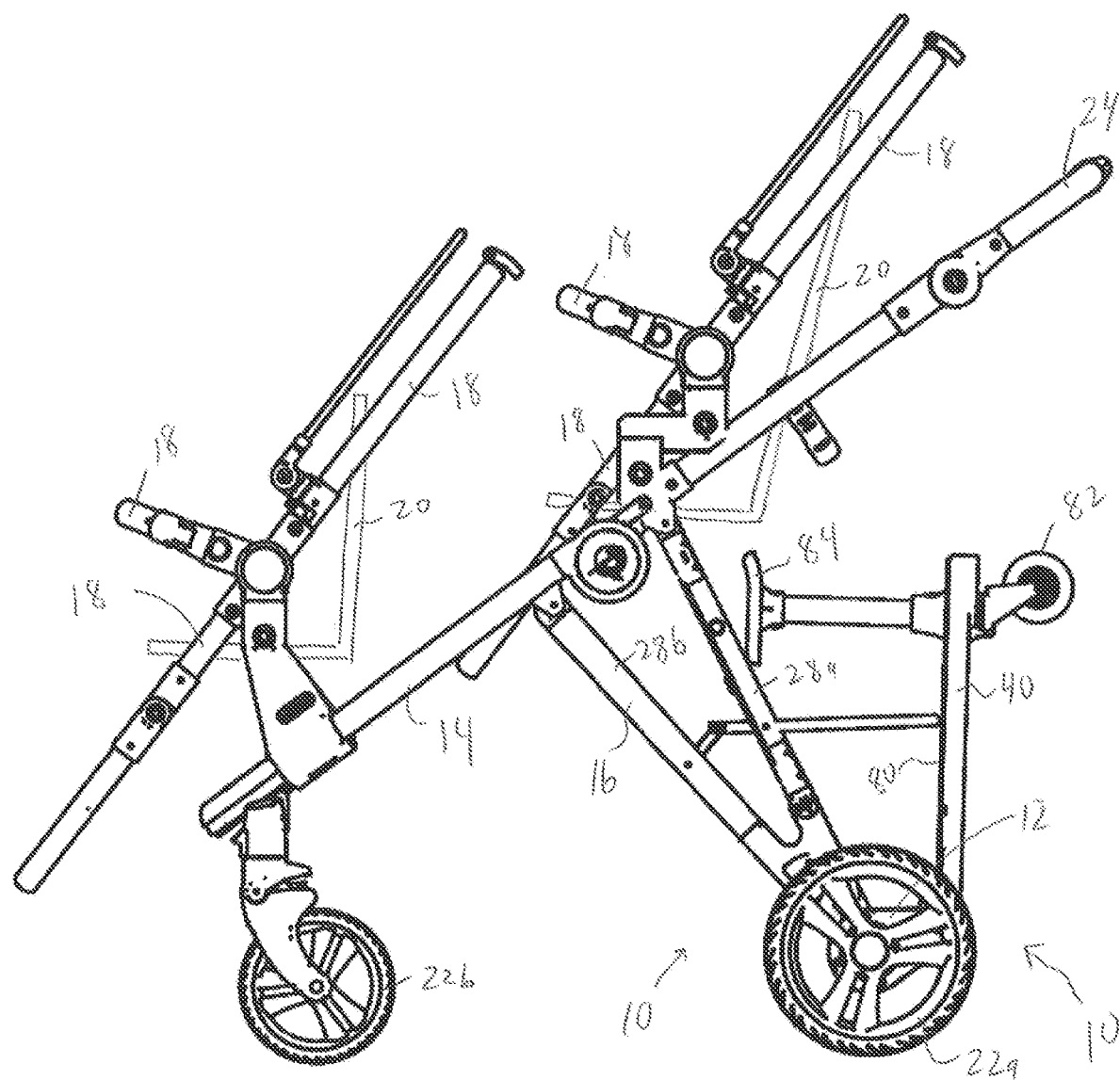
FIG. 14 is a side view of the stroller of FIG. 9, with the rider board pivoted to a storage position.

As shown in FIGS. 1, 2, 10 and 14 in one embodiment the system 10 can include an adapter 12 configured for use with a stroller, generally designated 14. The stroller 14, as best shown in FIGS. 1, 10 and 14 can include a stroller frame 16 which provides a structural framework to the stroller 14 and includes and/or supports one or more seat frames 18 each of which in turn supports a seat 20 to receive a child or infant occupant thereon. Two seats 20 are schematically shown in FIG. 14, and in one case the seats 20 can take the form of fabric or another relatively soft/pliable surface that is coupled to the associated seat frame 18 in a sling/hammock fashion. In other cases the seat(s) 20 can be relatively rigid components that are releasably coupled to the associated seat frame 18, in which case the seat(s) 20 can take the form of a car seat, infant carrier or the like. The illustrated stroller 14 includes two seat frames 18 (or is capable of receiving two seats 20), but if desired the stroller 14 may include only a single seat frame 18 (or be capable of receiving only a single seat 20), or may include more than two seat frames 18 in some cases.

The stroller 14 can include three or four wheels 22 (four wheels 22 as shown in the illustrated embodiment) coupled to the stroller frame 16, including two aligned rear wheels 22a and two aligned front wheels 22b, to enable the stroller 14 to be rolled across relatively flat surfaces. The stroller 14/stroller frame 16 includes a handle 24 which is configured to be positioned in front of an operator of the stroller 14, and which can be gripped and operated to push the stroller 14 in the desired direction. In some cases the handle 24 may be adjustable to be positioned at varying angles to suit the height and preferences of the operator.

In one embodiment, the stroller 14/stroller frame 16 includes a rear crossbar 26 extending between the two rear wheels 22a. In one case the rear crossbar 26 includes or receives an axle therein which rotationally couples the rear wheels 22a together, and/or receives a brake mechanism therein, but in other embodiments the rear crossbar 26 is provided for merely for stiffening/structural purposes.

The stroller 14/stroller frame 16 can also include a plurality of generally upwardly-extending support bars 28. Each support bar 28 can have a lower end located at or adjacent to an associated rear wheel 22a and/or a wheel hub 30 and/or the rear crossbar 26. In the illustrated embodiment the stroller 14/stroller frame 16 includes two rear support bars 28a, 28b located at or adjacent to each rear wheel 22a/wheel hub 30, each of which is oriented at differing angles. In the particular illustrated case the two rear support bars 28a, 28b attach/merge into a single structure/support bar at their lower ends, although the rear support bars 28a, 28b can remain distinct at their lower ends if desired. Moreover, if desired a single rear support bar 28 may be used, or more than two may be used. Each rear support bar 28 can extend upwardly away from the associated wheel 22, wheel hub 30 or rear crossbar 26 at an angle such that each support bar 28 extends or is oriented at a non-horizontal orientation (e.g. within +/−30 degrees of vertical in one case, or within +/−45 degrees of vertical in another case, or within +/−60 degrees of vertical in yet another case) when the stroller 14 is in its use position as shown in FIGS. 1, 10 and 14. Each support bar 28 can terminate, at its upper end, at or adjacent to one or more of the seat frames 18 and/or seats 20 to provide support to the seat(s) 20 and transfer the weight of the seat(s) 20 and any occupants to the wheels 22.

The stroller 14 can include a plurality of wheel hubs 30, and a rear wheel 22a can be releasably attached to each wheel hub 30. The wheel hubs 30 can be positioned on opposite ends of the rear crossbar 26, and be positioned mostly or entirely laterally outside the associated/adjacent support bar 28. In one case each rear wheel 22a can include a protruding axle 32 (FIGS. 2-4) that is insertable into an opening 34 (FIGS. 11-13) of the wheel hub 30 and retained therein to couple each rear wheel 22a to the associated wheel hub 30.

Figure 11:
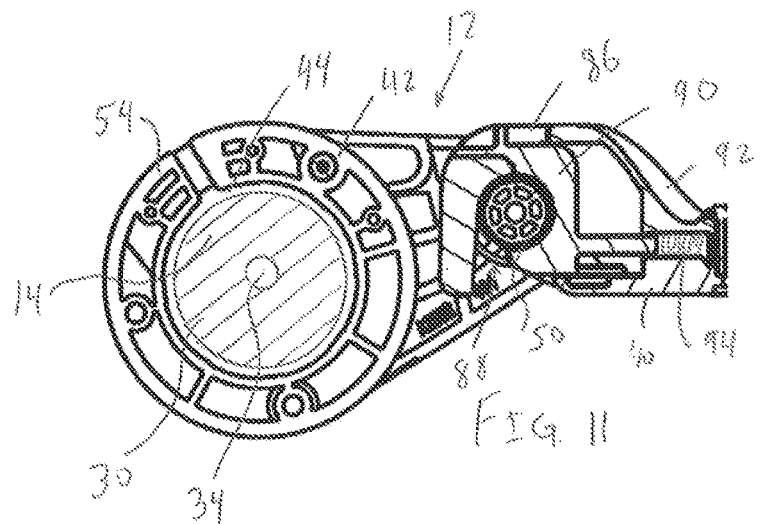
FIG. 11 is a side cross section along the plane marked "FIG. 11" of FIG. 10.
Figure 12:
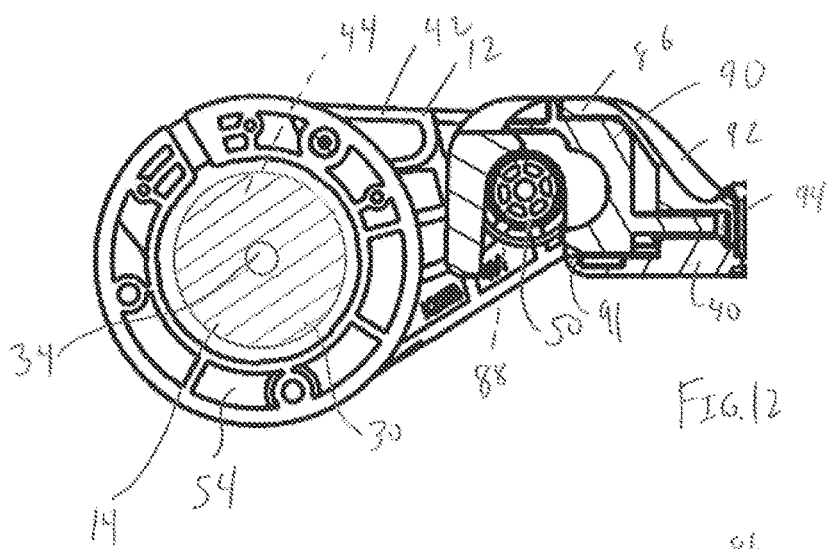
FIG. 12 shows the components of FIG. 11 with the latch in a retracted position.
Figure 13:
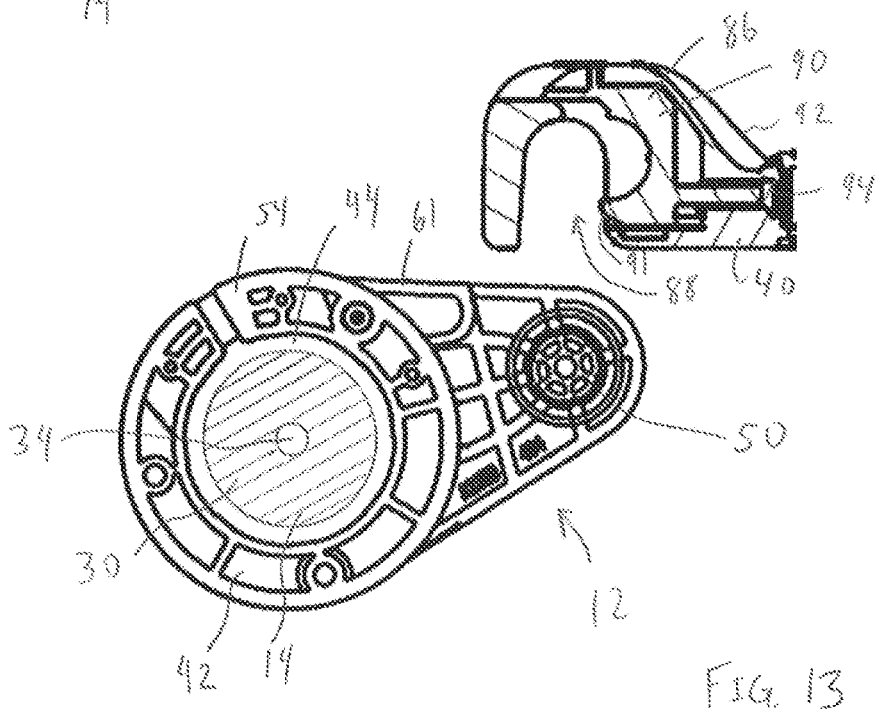
FIG. 13 shows the components of FIG. 12 with the rider board lifted away from the engagement bar.

The adapter 12 can be provided to couple a rider board 40 to the stroller 14. In particular, with reference to FIGS. 6 and 7, the adapter 12 can include an adapter body 42 having an opening 44 configured to closely receive a wheel hub 30 therein. For example, each wheel hub 30 is generally cylindrical or circular in cross-section in the illustrated embodiment, and in this case the opening 44 of the adapter 12 is also generally cylindrical or circular in cross section. The opening 44 can have a diameter slightly larger than the wheel hub 30 to closely receive the wheel hub 30 therein, as shown in FIGS. 11-13. The opening 44 can have a central axis that is oriented generally horizontally and/or generally parallel to the rear crossbar 26 and/or handle 24, when the adapter 12 is mounted to the stroller 14/stroller frame 16.

The adapter 12 can also include a recess 46 which extends generally radially relative to a central axis of the opening 44 and forms an opening in part of the outer surface of the body 42. The recess 46 is configured to closely receive the lower end(s) at least one of the support bars 28 therein (the lower ends of two of the support bars 28 in one case) when the adapter 12 is mounted in place, as will be described in greater detail below. The recess 46 can intersect and/or be in communication with the opening 44, and in one case has an axis/central axis that is oriented generally perpendicular to a central axis of the opening 44.

The adapter 12 further includes an engagement bar 50 which is configured to be oriented generally horizontally and generally parallel to the rear crossbar 26 and/or handle 24 when the adapter 12 is mounted to the stroller 14/stroller frame 16. The engagement bar 50 can be relatively short; and in particular can extend horizontally a significantly lesser length than the rear crossbar 26 and/or the width of the stroller 14/stroller frame 16, for example in one case less than about twenty-five percent of the rear crossbar 26/width of the stroller 14 or stroller frame 16 in one case.

As shown in FIG. 7, the adapter 12, in exploded view, can include a first side component 52 and a second side component 54 which are coupled together with the engagement bar 50 positioned therebetween. An internal support ring 56 can be positioned between the two side components 52, 54, and can provide a spring boss 58. The support ring 56 can be made of a relatively strong/stiff material, such as metal, to provide strength/stiffness to the adapter 12. A spring pin 60 can be mounted on the spring boss 58 thereon and is biased forwardly/axially outwardly. When the adapter 12 is assembled, as shown in FIG. 6, the spring pin 60 protrudes through an opening 62 of the second side component 54. The adapter 12 can also include a stop 64 positioned adjacent to the opening 62. The first 52 and second 54 side components, and the support ring 56 along with the engagement bar 50, can define the body 42 of the adapter 12. The adapter 12 can further include a pair of ribs 61 positioned on an upper surface thereof that can act as a tilt-stop for the rider board 40, as will be described in greater detail below.

The adapter 12 further includes a C-clip, clip or securing component 66 that is, in one embodiment, pivotally or otherwise moveable mounted to the adapter body 42/second side component 54. The clip 66 is in one embodiment pivotable about a clip axis 68 (FIG. 6) between a closed or engaged position, as shown in FIGS. 4-6, 8 and 9, and an open or retracted position, as shown in FIGS. 2 and 3. When the clip 66 is in the open position, the opening 44 and the recess 46 are in direct communication with no component positioned therebetween. On the other hand, when the clip 66 is in the closed position, the clip 66 can be considered to at least partially divide/separate the opening 44 and the recess 46 as best shown in FIG. 6.

In order to couple the adapter 12 to the stroller 14/stroller frame 16/wheel hub 30, in one embodiment one of the rear wheels 22a of the stroller 14 is first removed from the associated wheel hub 30, as shown in FIG. 2. In some cases the wheel 22a is secured to the stroller 14/stroller frame 16 solely by frictional/gripping forces between the axle 32 and the hub opening 34, and the wheel 22a can be removed by simply pulling the wheel 22a in the axial direction along the axle 32. In other embodiments, however, the wheel(s) 22a may be secured by various fasteners or the like which may be required to be first removed to remove the wheel(s) 22a.

Figure 4:
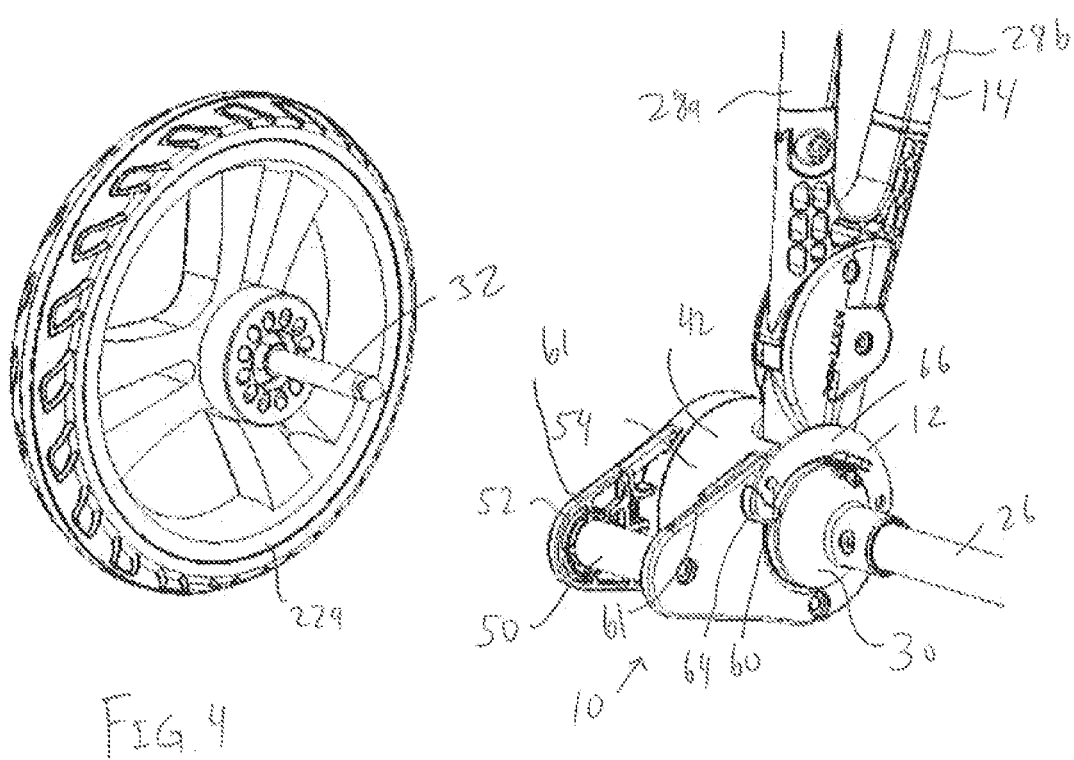
FIG. 4 shows the clip of the adapter of FIG. 2 moved to its closed position.

After the wheel 22a is removed, the adapter 12 is then positioned adjacent to the stroller frame 16, as shown in FIG. 2, and slid laterally onto the stroller frame 16, more particularly over the exposed wheel hub 30 as shown in FIG. 3. Once the adapter 12 is slid into place such that the wheel hub 30 is closely received in the opening 44 of the adapter 12, the lower end of one or both of the adjacent support bars 28 are closely received in the recess 46 to help secure the adapter 12 in place. After the adapter 12 is sufficiently inserted, as shown in FIG. 3, the clip 66 is then pivoted to its closed position as shown in FIG. 4.

The clip 66 may engage the stop 64 when the clip 66 is moved to the closed position to prevent over-rotation of the clip 66 and locate the clip 66 in the desired location. When the clip 66 is in the closed position, the pin 60 is received in an opening 70 of the clip 66 to retain the clip 66 in the closed position. However, it should be understood that various other clips, fasteners, retainers or the like besides the pin 60 can be used to retain the clip 66 in the closed position.

Figure 5:
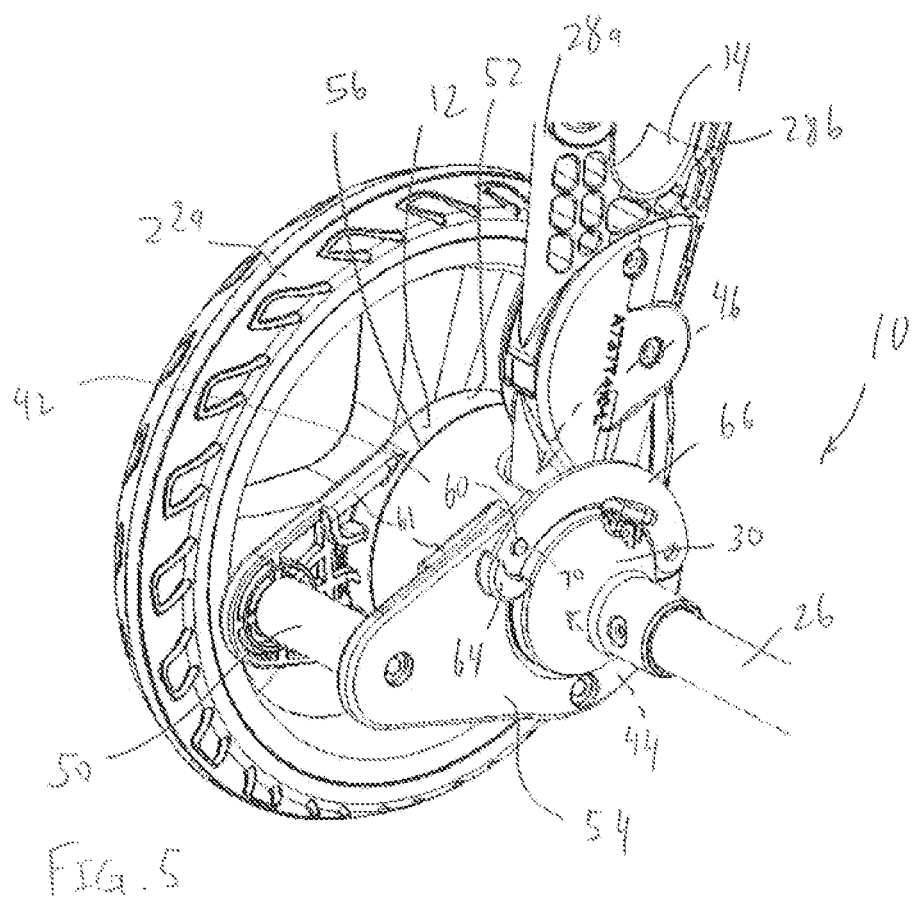
FIG. 5 shows the adapter and stroller portion of FIG. 4 with the wheel coupled to the stroller frame.

Once the adapter 12 is mounted the wheel 22a is then re-attached to the wheel hub 30 as shown in FIG. 5, and the adapter 12 is ready for use. When it is desired to remove the adapter 12, the spring pin 60 is depressed until it is clear of the opening 70 of the clip 66, and the clip 66 can then be pivoted to the open position, as shown in FIG. 3. The wheel 22a can be removed and the adapter 12 is then slid off of the wheel hub 30.

When the adapter 12 is mounted in the configuration shown in FIG. 5, the adapter 12 is securely held in place and prevented from being removed from the wheel hub 30/frame 16. In particular, the lower end of the support bar(s) 28 is trapped in the recess 46 such that the body 42 of the adapter 12 and the clip 66 together extend entirely circumferentially around the support bar(s) 28 (in top view) to trap the support bar(s) 28 to thereby prevent any lateral movement of the adapter 12 (e.g. along the central axis of the hub 30/opening 44). The trapped/secured support bar(s) 28 also prevent any circumferential movement of the adapter 12 (e.g. in the circumferential direction around the hub 30/opening 44).

Moreover, when the adapter 12 is mounted in place and the clip 66 is closed, the hub 30 is trapped in the opening 44 of the adapter 12 such that the body 42 of the adapter 12 and the clip 66 extend entirely circumferentially around the wheel hub 30 (e.g. in the axial end view of the adapter 12). The wheel hub 30 is thereby closely received in the opening 44, preventing any movement of the adapter 12 in the radial direction (e.g. along a radius of the wheel hub 30). In this manner the adapter 12, when mounted, is secured in place in all three directions/axes of movement.

When the adapter 12 is mounted on the wheel hub 30, and a first part of the adapter 12 is positioned on a first (outer) lateral side of the support bar(s) 28 and another, second, part of the adapter 12 (e.g. the clip 66) is positioned at a second (inner) lateral side of the support bar (s) 28, with the support bar(s) 28 trapped in place. In this manner, when the clip 66 is closed the adapter 12 "wraps around" the support bar(s) 28 leverages the support bar(s) 28 as a stabilizing feature to lock the adapter 12 in place. When the adapter 12 is mounted in place and the clip 66 is closed, the adapter 12 also "wraps around" the wheel hub 30 to further secure the adapter 12 in place.

Figure 8:
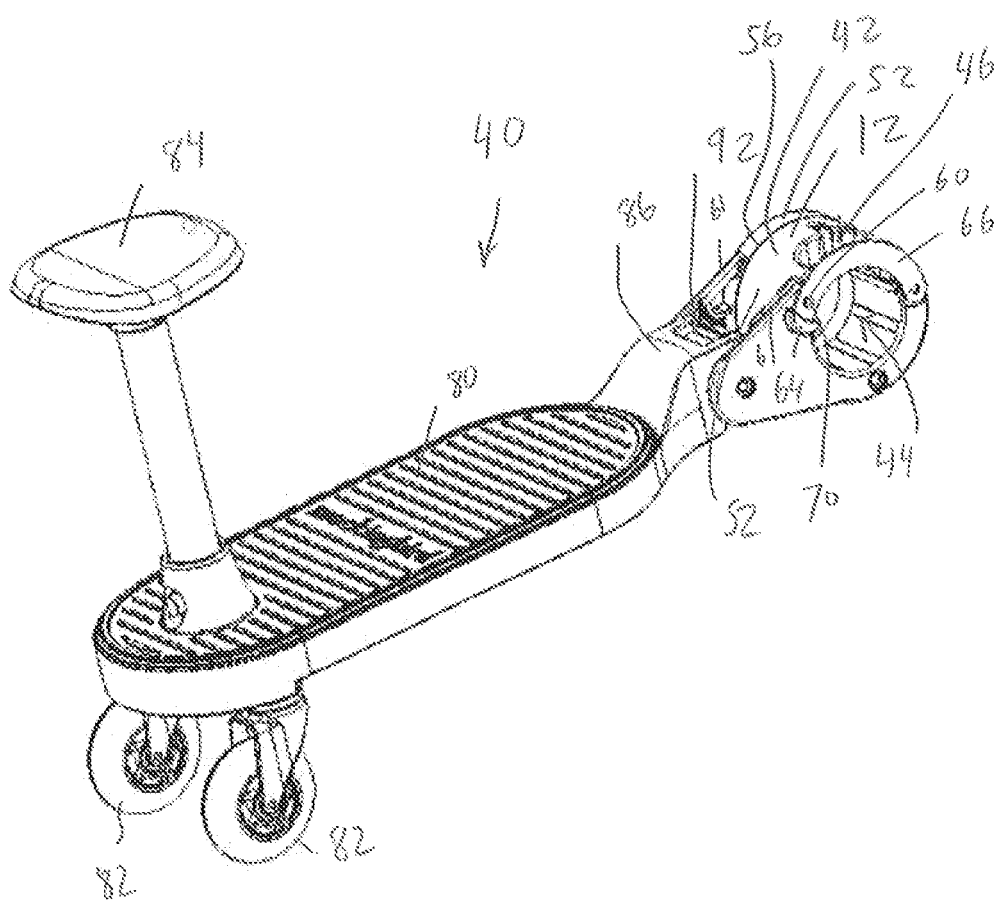
FIG. 8 is a rear perspective view of a rider board coupled to the adapter of FIG. 6.
Figure 9:
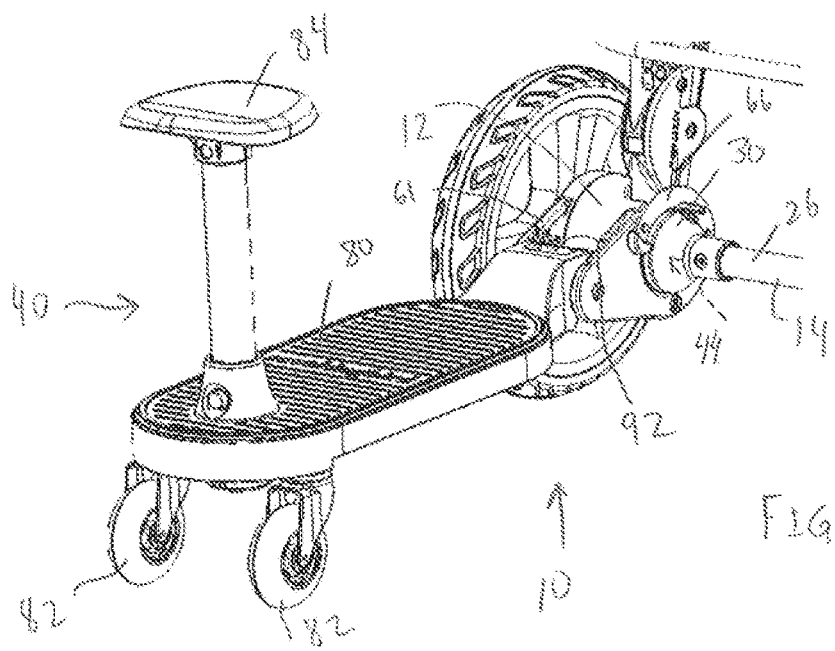
FIG. 9 shows the rider board and adapter of FIG. 8 coupled to the stroller.

As shown in FIGS. 8-10, the rider board 40 can provide a structure upon which a child or other user can stand or ride during use of the stroller 14. The rider board 40 can include a generally flat, planar support surface 80 with at least one wheel 82 (two wheels 82 in the illustrated embodiment) coupled to an underside of the support surface 80. In the illustrated embodiment, the rider board 40 can include a rider board seat 84 that is removably attachable to the support surface 80, upon which a user can sit during use of the rider board 40.

The rider board 40 can include an arm 86 at its forward end which includes a rider board recess 88 (FIGS. 11-13) which is configured to receive the engagement bar 50 therein. In particular, the rider board recess 88 can have a size and/or shape generally corresponding to that of the engagement bar 50, or slightly larger thereof, to provide a close connection.

With continued reference to FIGS. 11-13, the rider board 40 can include a latch 90 (or rider board securing component) positioned adjacent to the rider board recess 88 that is moveable between an engaged position (FIG. 11) and a retracted position (FIGS. 12 and 13). The latch 90 can be operatively coupled to an actuator 92 that can be manually operated to move the latch 90 between its retracted and engaged positions. In the illustrated embodiment, the latch 90 is biased forwardly to its engaged position by a rider board spring 94.

In order to attach the rider board 40 to the stroller 14/engagement bar 50, the rider board 40 is first positioned above adapter 12 such that the rider board recess 88 is aligned with the engagement bar 50, as shown in FIG. 13. The user/operator then pulls the actuator 92 rearwardly to move the rider board latch 90 to the retracted position, thereby compressing the rider board spring 94 and moving the rider board latch 90 to its position shown in FIG. 13. The rider board 40 is then lowered until the engagement bar 50 is received in the rider board recess 88, as shown in FIG. 12. The actuator 92 is then released to allow the rider board latch 90 to return to its engaged position shown in FIG. 11. When the rider board latch 90 is in its engaged position, the engagement bar 50 is trapped between the rider board latch 90 and the arm 86, thereby securing the rider board 40 to the engagement bar 50/stroller 14/stroller frame 16. In this manner the rider board 40 is attachable to the engagement bar 50 in a radial direction (relative to the engagement bar 50), which provides a quick and easy connection since the latch 90 does not need to be slid in place in the axial direction (relative to the engagement bar 50).

However it should be understood that the actuator 92 need not necessarily need to be retracted in order to couple the rider board 40 to the adapter 12. Instead, in some cases the rider board latch 90 may have an angled surface 91 on its underside that enables the rider board latch 90 to be sufficiently retracted simply by positioning the rider board latch 90 over the engagement bar 50, and applying sufficient downward pressure. Moreover, it should be understood that the rider board 40 can be releasably coupled to the adapter 12/engagement bar 50 by any of a wide variety of devices and mechanisms other than the latch 90 shown in FIGS. 11-13. Finally, although FIGS. 2-5, 9 and 10 show the adapter 12/rider board 40 attached to a left rear wheel 22a, it should be understood that the adapter 12/rider board 40 can be attached to the stroller 14/stroller frame 16 at various other positions, including at/on the right rear wheel 22a.

In one embodiment, due to the interaction between the rider board recess 88 and the engagement bar 50, the rider board 40 is pivotable about an axis defined by the engagement bar 50. In this manner, the rider board 40 can be pivoted from a use position in which the support surface 80 is oriented generally horizontally (FIGS. 8-10), to a storage position as shown in FIG. 14 where the support surface 80 is oriented generally vertically (or in one case at an angle of +/−30 degrees of vertical, and in one case at an angle of +/−45 degrees of vertical). In one case, when the rider board 40 is pivoted to its storage position, the rider board 40 engages the ribs 61 to prevent over-rotation of the rider board 40, to keep the rider board 40 spaced away from the stroller frame 16 and in the desired position.

In sum, it can be seen that the adapter 12 can be relatively easily coupled to the stroller 14. The adapter 12 can, if desired, remain in place throughout use of the stroller 14, and thereby be considered to be "permanently" attached to the stroller 14. The adapter 12 is relatively low profile and low weight and can remain in place on the stroller 14 with little if any noticeable effects. When it is desired to secure the rider board 40 to the stroller 14, the adapter 12 provides a mechanism for attachment via the engagement bar 50. As can be seen the engagement bar 50 extends rearwardly of the location where the adapter 12 is coupled to the stroller 14 (e.g. the wheel hub 30 in one case) and/or is positioned rearwardly of the stroller frame 16/rear crossbar 26/support bar(s) 28. In this manner the adapter 12/engagement bar 50 acts as an "outboard" attachment which is easier for the user to reach and access as compared to other structures, such as the wheel hub 30, rear crossbar 26 or support bars 28. Moreover, as described above, the opening 44, recess 46 and clip 66 cooperate to securely couple the adapter 12 to the stroller frame 16 to prevent removal, twisting or movement thereof.

Having described the invention in detail and by reference to the preferred embodiments, it will be apparent that modifications and variations thereof are possible without departing from the scope of the invention.

What is claimed is:

1. A system comprising:
   an adapter configured to releasably couple a rider board to a stroller including at least one support bar, wherein the adapter is configured to be coupled to a frame of the stroller, wherein the adapter includes:
   an engagement bar configured to be positioned rearwardly of a portion of the frame to which the adapter is coupleable;
   a body having a recess configured to closely receive the at least one support bar of the stroller therein, the body further having an opening configured to closely receive a wheel hub of the stroller therein, wherein the opening is in communication with the recess; and
   a securing component that is pivotable between a closed position, wherein the securing component is configured to secure the adapter to the frame, and an open position wherein the securing component is not configured to secure the adapter to the frame, and wherein the securing component is selectively lockable in the closed position.

2. The system of claim 1 wherein the securing component is configured such that when the securing component is in the closed position the securing component is positioned between and the recess and the opening.

3. The system of claim 1 wherein the engagement bar is configured to be positioned rearwardly of a rear crossbar of the stroller when the adapter is coupled to the stroller.

4. The system of claim 1 wherein the adapter is coupled to the frame of the stroller, wherein the engagement bar is positioned rearwardly of the portion of the frame to which the adapter is coupled, and wherein the recess closely receives the least one support bar of the stroller therein.

5. The system of claim 4 wherein the adapter is coupled to the wheel hub, wherein the opening closely receives the wheel hub therein, and wherein the at least one support bar is coupled to the wheel hub and extends upwardly therefrom to a seat frame of the stroller.

6. The system of claim 5 wherein the at least one support bar is oriented vertically or within about 60 degrees of vertical when the stroller is in an operating position.

7. The system of claim 1 wherein a first part of the adapter is configured to be positioned on a first lateral side of the at least one support bar and a second part of the adapter is configured to be positioned on a second lateral side of the at least one support bar to thereby trap the support bar therebetween.

8. The system of claim 7 wherein the first part of the adapter is the body of the adapter and the second part of the adapter is the securing component.

9. The system of claim 1 wherein the securing component is configured to trap the wheel hub between the securing component and the body when the securing component is in the closed position.

10. The system of claim 9 wherein the body and the securing component are configured such that, when the adapter is coupled to the stroller and the securing component is the closed position, the body and the securing component together extend entirely circumferentially around the wheel hub.

11. The system of claim 1 wherein the body and the securing component are configured such that, when the adapter is coupled to the stroller and the securing component is the closed position, the body and the securing component together extend entirely circumferentially around the support bar.

12. The system of claim 1 wherein the engagement bar is configured to be oriented generally horizontally, and positioned between a pair of rear wheels of the stroller, when the adapter is coupled to the stroller.

13. The system of claim 1 further comprising a rider board including a generally flat and planar support surface, and at least one wheel coupled to an underside of the support surface, wherein the rider board is attachable to the engagement bar by moving the rider board in a direction perpendicular to an axis of the engagement bar.

14. The system of claim 13 wherein the rider board includes a rider board recess configured to receive the engagement bar therein, and a rider board securing component configured to removably couple the rider board to the engagement bar.

15. A system comprising:
an adapter configured to releasably couple a rider board to a stroller including at least one support bar and a wheel hub, wherein the adapter includes an opening configured to receive the wheel hub of the stroller therein and a recess configured to receive the at least one support bar therein, wherein the adapter includes a securing component movable between a closed position wherein the securing component secures the adapter to the stroller, and an open position wherein the securing component does not secure the adapter to the stroller, wherein the adapter is configured such that when the adapter is coupled to the stroller and when the securing component is in the closed position, the securing component is positioned between and the recess and the opening, and wherein the adapter includes an engagement bar configured to be positioned rearwardly of a portion of the frame of the stroller to which the adapter is coupled.

16. A system comprising:
an adapter configured to releasably couple a rider board to a stroller including at least one support bar and a wheel hub, wherein the adapter includes an opening configured to receive the wheel hub of the stroller therein and a recess configured to receive the at least one support bar therein, wherein the adapter includes a securing component movable between a closed position wherein the securing component secures the adapter to the stroller, and an open position wherein the securing component does not secure the adapter to the stroller, wherein a first part of the adapter is configured to be positioned on a first lateral side of the support bar and a second part of the adapter is configured to be positioned on a second lateral side of the support bar when the adapter is coupled to the stroller to thereby trap the support bar therebetween, and wherein the adapter includes an engagement bar configured to be positioned rearwardly of a portion of the frame of the stroller to which the adapter is coupled.

17. The system of claim 16 wherein the securing component is configured such that when the securing component is in the closed position the securing component is positioned between and the recess and the opening, and wherein the adapter is rigid and the recess has an axis that is oriented generally perpendicular to a central axis of the opening.

18. A system comprising:
an adapter configured to releasably couple a rider board to a stroller, wherein the adapter is configured to be coupled to a frame of the stroller, wherein the adapter includes:
an engagement bar configured to be positioned rearwardly of a portion of the frame to which the adapter is coupleable;
a rigid securing component that is pivotable between an open position wherein the securing component is not configured to secure the adapter to the frame and a closed position wherein the securing component is configured to prevent removal of the adapter from the stroller frame;
a recess configured to closely receive at least one support bar of the stroller therein; and
an opening configured to closely receive a wheel hub of the stroller therein, wherein the opening is in communication with the recess.

19. The system of claim 15 wherein the securing component is sufficiently rigid to retain its shape when pivoting between the open position and the closed position.

20. The system of claim 15 wherein the opening and the recess are positioned adjacent to each other and directly communicate with each other.

21. The system of claim 16 wherein the securing component is rigid, and is sufficiently rigid to retain its shape when pivoting between the open position and the closed position, wherein the opening and the recess are positioned adjacent to each other and directly communicate with each other when the securing component is in the open position.

* * * * *